Oct. 4, 1966   W. E. DORSETT   3,276,292
ADJUSTABLE SECTOR MECHANISM
Filed April 17, 1964   2 Sheets-Sheet 1
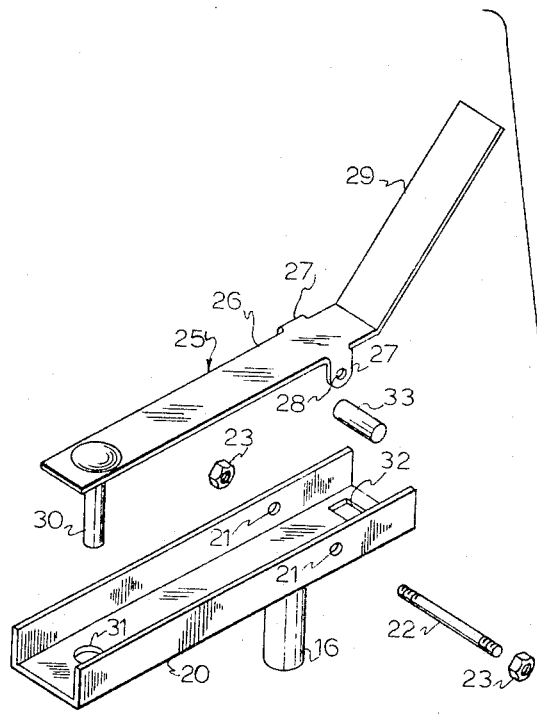
FIG. 1
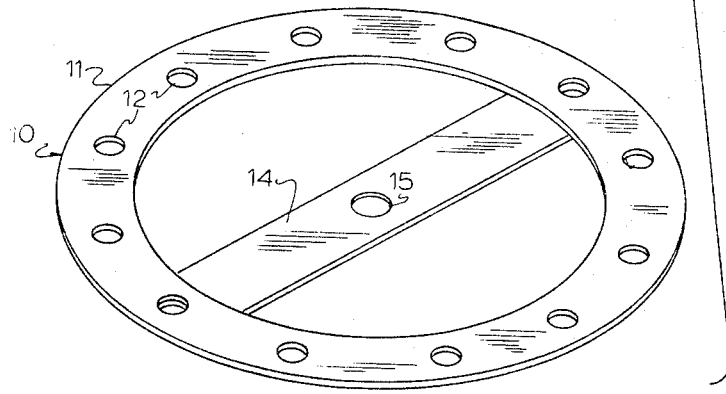
INVENTOR.
WENDELL E. DORSETT
BY
Newton, Hopkins & Jones
ATTORNEYS Oct. 4, 1966

W. E. DORSETT 3,276,292

ADJUSTABLE SECTOR MECHANISM

Filed April 17, 1964

*INVENTOR.*
WENDELL E. DORSETT

BY

*Newton, Hopkins & Jones*

ATTORNEYS

United States Patent Office 3,276,292
Patented Oct. 4, 1966

3,276,292
ADJUSTABLE SECTOR MECHANISM
Wendell E. Dorsett, Albany, Ga., assignor to Lilliston Implement Company, Albany, Ga., a corporation of Georgia
Filed Apr. 17, 1964, Ser. No. 360,546
5 Claims. (Cl. 74—813)

This invention relates to adjustable sector mechanisms and is particularly concerned with means for selectively securing a rotatable element at a predetermined angle of rotation.

In a wide variety of mechanical interrelationships it is desirable to provide readily engageable and disengageable means for retaining a shaft or other rotary element in one or another selectable angles of rotation. Heretofore the adjustment and retention of a shaft at a predetermined angle of rotation with respect to cooperating parts has been achieved only by the use of multiple, intricate and cumbersome arrangements difficult of manipulation and readily subject to maladjustment.

The present invention provides a novel, simple, rugged and durable structure well designed to meet the demands of economic manufacture by which a selected angle of rotation of a rotary shaft may be achieved and retained. Thus, it is among the primary objects of the invention to provide novel, effective and efficient manually operable means for locating a rotary member at a predetermined angle of rotation and for securing such member in such predetermined angle of rotation. More specifically it is among the objects of the present invention to provide readily adjustable means for varying the angular relation between a relatively fixed arcuate element and a diametrically extending element rotatably movable with respect to the axis of the relatively fixed member. A further object of the invention is to provide improved means for readily engaging and disengaging associated parts in predetermined selected relationship. Numerous other objects, features and advantages of the present invention will be apparent from a consideration of the following specification taken in connection with the accompanying drawings.

In general terms that form of the invention herein presented by way of illustration may be defined as including a relatively fixed selector plate characterized by the provision of a plurality of circumferentially arranged angularity determining apertures, detents, recesses, notches, or the like defining selectable stations of angularity for associated parts. The selector plate is mounted in any suitable manner to be relatively fixed with respect to a rotatably movable element such as a shaft, the angularity of which with respect to the selector plate is to be varied from time to time and which is to be retained in the selected angular relationship. The relatively movable element is here represented by a shaft extending through the stationary selector plate and relatively rotatable on its own axis. The selector here preferred is a member mounted for rotation with the shaft and extending over the selector plate. This preferred selector includes a movable latch element having a projection releasably engageable with a selected aperture, detent, recess or notch of the selector plate as an incident to manipulation of the selector to establish a new angular relationship between the shaft and the plate. The latch is normally urged toward engagement with the selector plate by unique and improved yieldable means.

In the drawings:

FIG. 1 is an exploded view of one preferred form of the present invention.

Figure 2:
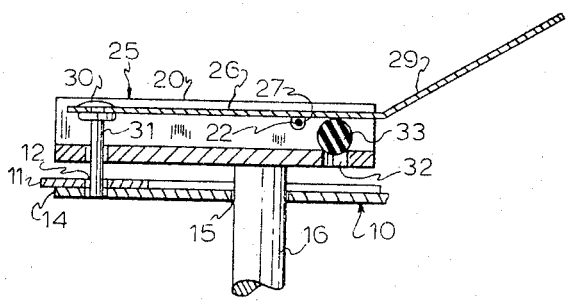
FIG. 2 is a central vertical section of that form of the invention shown in FIG. 1 with parts in assembled relationship.

In the drawings the numeral 10 indicates generally a selector plate of the type presently preferred in carrying out the present invention. The selector plate 10 is shown as including a peripheral, circular rim 11 provided with a circumferential series of equally spaced angularity determining projection receiving apertures 12. Diametrically extending across the rim 11 there is provided a centrally apertured mounting bar 14. The central aperture 15 of the bar 14 is adapted to loosely receive therethrough a shaft 16 illustrative of the member which is to be selectively engaged in predetermined angular relation with respect to the relatively fixed selected plate 10. It will of course be understood that the selector plate 10 is to be secured in a fixed position to associated parts with respect to which a selected angularity of the shaft 16 is desired.

With respect to the selector plate 10 which is here shown as provided with a fully circular rim 11, it will of course be understood that in carrying out the invention the rim may be limited to a portion of a complete circle to define a sector with respect to which the angularity of the shaft 16 may be established and retained. It will also be understood that while in the present form of the invention the selectable angular relation of the shaft 16 with respect to the selector plate is determined by the equally spaced arcuate series of apertures 12, such apertures may be otherwise spaced and of such numbers as any given situation may dictate. Further, as suggested, selectable stations may be designated by detents, recesses or notches as alternate means for receiving the projection of the latch member, hereinafter described, by which the selected rotational angularity is maintained between the shaft 16 and the selector plate.

Fixably mounted on the shaft 16 for rotation therewith and as a means for retaining the angular relation of the shaft 16 with respect to the selector plate 10 there is provided, a selector including an elongate base member 20 here shown in the form of an upwardly open trough of generally U-shaped cross section. At any suitable location longitudinally through the sides of the trough apertures 21 are provided to receive therethrough a latch pintle 22 here shown as a bolt threaded at each end. Nuts 23 are provided for securing the pintle 22 across the base member 20.

Mounted within the trough formed by the side walls of the base member 20 of the selector, for pivotal movement on the pintle 22, is the latch generally indicated by the numeral 25. The latch 25 includes an elongate body 26 formed with downwardly turned ears 27 apertured as at 28 to receive the pintle 22 therethrough. At one end of the latch body 26 a projection 30, here shown as in the form of a bolt extending through the body, is provided. At the opposite end of the body, in that form of the invention shown in FIGS. 1 and 2, the body is formed with an angularly extending, integral, manipulating handle 29.

For biasing the latch toward extension of the projection 30 through the registering aperture 31 of the transverse portion of the base member 20, to be received within an aperture 12 of the rim 11, a cylindrical, elastic and resilient bolster 33 is provided seated within a transverse rectangular opening 32 in the base member 20 of the selector. The relation in size and location of the cylindrical bolster 23 with respect to the opening 32 and the mounting of the latch member is such that the upper surface of the bolster 33 will bear against the under surface of the latch body 26 adjacent the ears 27; thus biasing the latch 25 toward counterclockwise rotation. When the latch is in horizontal position its projection 30 is extended into an aperture 12 of the rim 11. However, the resiliency and the flexibility of the bolster 33 is such as to permit its compression upon pivotal movement of the latch member by manipulation of its angularly projecting handle 29. Thus, in that form of the invention shown in FIGS. 1 and 2, clockwise pivotal movement of the latch in response to downward pressure upon the handle 29 elevates the projection 30 from its engagement with the selected aperture 12 of the rim 11 of the selector plate 10. Upon such release the shaft 16 is free to rotate with respect to the selector plate 10 in response to movement of the handle 29. A new angular orientation may thus be established and upon releasing of the handle 29, the latch member will permit the bolster 33 to move the projection 30 to engage the aperture of the selector plate 10 conforming with the newly selected angularity of the shaft 16.

Figure 3:
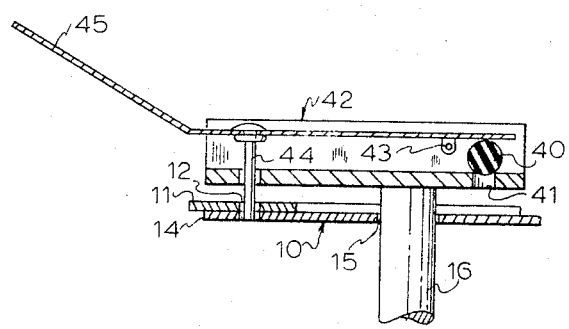
FIG. 3 is a view similar to FIG. 2 of a modified form of the invention.

In that form of the invention shown in FIG. 3 the bolster 40 is arranged in its aperture 41 of the selector 42 outwardly from the pivotal point 43 of the latch member to bear against the under side of the latch member. The projection 44 is mounted adjacent the manual manipulating handle 45. In this instance, while the resiliency of the bolster 40 will retain the projection 44 in its selected location in an aperture 12 of the selector plate 10 as in the case of the arrangement of FIGS. 1 and 2, a release of the pin from the aperture 12 is achieved by lifting the handle 45 against the pressure of the bolster 40, compressing the bolster as the projection 44 is released from the selector plate 10. Obviously, when a new angular relation to shaft 16 with respect to the selector plate 10 is achieved a release of the handle 45 will provide for the insertion of the projection 44, in the next selected aperture, under pressure from the bolster.

From the foregoing it is seen that the present invention provides a novel, simple and improved means for selectively engaging a mechanical instrumentality in predetermined angular relation with a relatively fixed member, and to provide for a release of such engagement as an incident to manipulation of the selector to a new predetermined angular relation. It will of course be understood that in the practice of the invention numerous changes and modifications may be made, and the full use of equivalents resorted to without departing from the spirit or scope of the invention as outlined in the appended claims.

What is claimed as my inventions is:

1. The combination with a member fixedly mounted in a fixed plane defining an arcuate series of latch element receiving and engaging means, of an angularly adjustable member mounted for angular adjustment on a fixed axis normal to the fixed plane of said fixedly mounted member, and a generally U-shaped selector arm mounted for movement with the angular adjustment of said shaft in a plane parallel to and adjacent the plane of said fixedly mounted member, said arm including a latch pivotally mounted within the U-shaped confines of said selector arm, said latch including an element releasably engageable with said receiving and engaging means and a cylindrical resilient bolster disposed transversely of said selector arm for urging said element towards reception in and engagement by said latch element receiving and engaging means of said fixedly mounted member.

2. In an adjustable sector mechanism the subcombination of an elongate selector arm of generally U-shaped cross section, an elongate latch body pivotally mounted within the confines of said selector arm to extend longitudinally thereof, a latch pin rigidly secured to said body to extend therefrom in a plane normal thereto, and an elastic and resilient cylindrical bolster disposed transversely within the confines of said arm in contact with said arm and said latch body for resiliently resisting pivotal movement of said arm in one direction.

3. The subcombination set forth in claim 2 in which the latch body is extended angularly from the selector arm adjacent the pin to provide an integral manipulating handle.

4. The subcombination set forth in claim 2 in which the latch body is extended angularly from the selector arm adjacent the bolster to provide an integral manipulating handle.

5. A selector mechanism for electing and maintaining a predetermined angularity between interrelated members wherein;
- (A) one of said members is a relatively fixed plate defining an arcuate series of selectable stations designating predetermined angular relationships between the members;
- (B) The other member being a shaft rotatable with respect to the relatively fixed plate on an axis normal to the plane thereof in angular increments commensurate with the spacing of the selectable stations of the relatively fixed plate;
- (C) a selector arm including a latch fixedly mounted on the rotatable shaft to move therewith;
  - (1) the latch having a pin releasably engageable at the stations defined by the relatively fixed plate;
  - (2) the latch having an extension protruding at an angle from the arm to facilitate manual activation of the pin to release the latch from the relatively fixed plate and to rotate the shaft as an incident to the release of the pin;
  - (3) and means for biasing the latch pin towards the fixed plate which means is in the form of a cylindrical resilient bolster.

References Cited by the Examiner

UNITED STATES PATENTS

| | | | |
|---|---|---|---|
| 395,414 | 1/1889 | Wright | 74—145 |
| 452,496 | 5/1891 | Linder | 74—813 |
| 612,412 | 10/1898 | Grohmann | 74—813 X |
| 631,893 | 8/1899 | Jones et al. | 74—813 |
| 692,033 | 1/1902 | Rivett | 74—813 |

FRED C. MATTERN, Jr., *Primary Examiner.*

BROUGHTON G. DURHAM, *Examiner.*

J. A. MARSHALL, *Assistant Examiner.*